United States Patent
Kline et al.

(10) Patent No.: US 9,519,758 B2
(45) Date of Patent: Dec. 13, 2016

(54) SYSTEM AND PROCESS FOR MONITORING MALICIOUS ACCESS OF PROTECTED CONTENT

(71) Applicant: Pegasus Media Security, LLC, Reston, VA (US)

(72) Inventors: Paul A. Kline, Reston, VA (US); Allan M. Weinstein, Reston, VA (US); David J. Weinstein, Reston, VA (US); Changsheng Yang, Reston, VA (US)

(73) Assignee: Pegasus Media Security, LLC, Reston, VA (US)

( * ) Notice: Subject to any disclaimer, the term of this patent is extended or adjusted under 35 U.S.C. 154(b) by 0 days.

(21) Appl. No.: 14/172,599

(22) Filed: Feb. 4, 2014

(65) Prior Publication Data

US 2015/0220707 A1    Aug. 6, 2015

(51) Int. Cl.
| | |
|---|---|
| *G06F 17/30* | (2006.01) |
| *G06F 21/10* | (2013.01) |
| *G06F 21/62* | (2013.01) |
| *G06F 21/53* | (2013.01) |
| *G06F 21/84* | (2013.01) |

(52) U.S. Cl.
CPC ............ *G06F 21/10* (2013.01); *G06F 21/53* (2013.01); *G06F 21/6218* (2013.01); *G06F 21/84* (2013.01); *G06F 2221/0728* (2013.01)

(58) Field of Classification Search
CPC ...... H04L 63/1408; H04L 63/10; H04L 43/08; H04L 43/10; G06F 21/84; G06F 21/554; G06F 21/566; G06F 21/10; G06F 11/3466; G06F 21/564; G06F 21/54; G06F 21/62; H04N 19/61
See application file for complete search history.

(56) References Cited

U.S. PATENT DOCUMENTS

| | | | | |
|---|---|---|---|---|
| 5,675,803 | A * | 10/1997 | Preisler | G06F 11/3644 714/E11.21 |
| 6,718,485 | B1 * | 4/2004 | Reiser | G06F 11/3466 712/227 |
| 8,099,596 | B1 * | 1/2012 | Rusakov | G06F 21/53 380/200 |
| 2005/0091513 | A1 * | 4/2005 | Mitomo | H04L 63/10 713/188 |

(Continued)

OTHER PUBLICATIONS

International Search Report and Written Opinion mailed on May 19, 2015 for International Application No. PCT/US2015/013670.

*Primary Examiner* — Farid Homayounmehr
*Assistant Examiner* — Lizbeth Torres-Diaz

(57) ABSTRACT

A method detects unauthorized access of data, and includes receiving data from a content provider by a content reproducing device; storing the received data in a memory storage device of the content reproducing device; obtaining an address range of a buffer of the content reproducing device; intercepting system application programming interface calls related to memory access of the address range of the buffer; comparing the intercepted system application programming interface calls to an expected sequence of memory access calls; and determining that a particular memory access call is unauthorized when the particular memory access call accesses the address range of the buffer while not belonging to the expected sequence of memory access calls.

29 Claims, 4 Drawing Sheets

(56) References Cited

U.S. PATENT DOCUMENTS

| | | | |
|---|---|---|---|
| 2005/0125619 A1* | 6/2005 | Evans | G06F 21/84 |
| | | | 711/163 |
| 2005/0204165 A1* | 9/2005 | Nason | G06F 21/82 |
| | | | 726/5 |
| 2006/0248310 A1* | 11/2006 | Kavalam | G06F 11/3485 |
| | | | 712/11 |
| 2007/0198841 A1* | 8/2007 | Lundblade | G06F 21/52 |
| | | | 713/176 |
| 2008/0002773 A1* | 1/2008 | Lai | H04N 19/61 |
| | | | 375/240.16 |
| 2008/0016339 A1* | 1/2008 | Shukla | G06F 21/53 |
| | | | 713/164 |
| 2008/0022406 A1* | 1/2008 | Clift | G06F 21/55 |
| | | | 726/24 |
| 2009/0064347 A1* | 3/2009 | Bang | G06F 21/10 |
| | | | 726/29 |
| 2009/0288167 A1* | 11/2009 | Freericks | G06F 21/54 |
| | | | 726/23 |
| 2010/0293392 A1 | 11/2010 | Miyamoto | |
| 2012/0222031 A1* | 8/2012 | Derr | G06F 9/5027 |
| | | | 718/100 |
| 2012/0255004 A1* | 10/2012 | Sallam | G06F 21/554 |
| | | | 726/23 |
| 2013/0166922 A1 | 6/2013 | Wong et al. | |
| 2014/0282416 A1* | 9/2014 | Shepherd | G06F 11/3644 |
| | | | 717/125 |
| 2015/0095874 A1* | 4/2015 | Tapaninen | G06F 9/4426 |
| | | | 717/100 |

\* cited by examiner

SYSTEM AND PROCESS FOR MONITORING MALICIOUS ACCESS OF PROTECTED CONTENT

TECHNICAL FIELD

The technical field relates to digital rights management (DRM), a category of products and technologies that aims to secure access to digital media and to protect it from unauthorized use.

BACKGROUND

With the advent of digital media—video, audio, image, text, games and other forms of content stored and delivered in digital formats—DRM that aims to secure access to content and protect it from unauthorized use has become widely implemented. Though the methodologies DRM solutions employ may vary, the objectives of DRM are usually to increase privacy and prevent piracy, namely the unauthorized and typically illegal acquisition of copyrighted or confidential content; to attempt to ensure that the content that is being monetized is not consumed (for example viewed, listened to, played or read) without collecting payment from the consumer; to attempt to ensure that content is used within the constraints (often licensing terms) stipulated by the content owner; and to maintain a record of the identity of the original content holder (i.e., a licensee of content, or a buyer of content) for a particular piece of content, even if the content asset has been pirated, to facilitate investigation and prosecution of the pirates of the content.

A single DRM product or a group of DRM products may be used in conjunction with one another to protect content during all of the below stages in the digital-media distribution process:

1.) While media is stored in a media source; 2.) While media is being delivered from a media source to a media player (one example of this is media that is being transmitted from a media server to a media player over a network, such as the Internet); and 3.) While media is processed by the media player and delivered to a display device. A display device may be a monitor, a screen, a television, a projector, a personal computer, a smartphone or any other hardware that permits a user to play media.

Media remains vulnerable to piracy and other forms of unauthorized use while it is being transmitted to a screen (or some other device that transmits content for a user's perception), because the media is in an unencrypted format when it is being transmitted to the screen.

The "analog hole" or the "analog loophole" is one example of the media's vulnerability during its transmission to a screen. The "analog hole" refers to digital media's vulnerability to piracy when it is decoded while it is being transmitted to a display device by a decoder (from the digital format in which it was previously encoded). Another example of this type of vulnerability can also be seen in digital formats, such the HDMI format which is often used to provide media data to display devices. HDMI utilizes digital data, but it is still susceptible to the type of unauthorized use noted above. Malicious users may try to make a copy of the media content after the media content has been decrypted in preparation for being displayed on the display device. These two examples of vulnerability are not exclusive, and there are other such examples.

The present invention recognizes such vulnerably of media data, whether it is video or audio data, just prior to being presented to a user on a visual display device and/or an audio reproducing device, and proposes a number of approaches to monitor and protect content after it has been decrypted (or otherwise stripped of protective measures) and is being transmitted to the visual display device and/or audio reproducing device.

SUMMARY

The following embodiments provide a summary of the disclosure, but are in no way intended to limit the scope of the invention.

In an embodiment, a method of detecting an unauthorized access of data includes receiving data from a content provider by a content reproducing device; storing the received data in a memory storage device of the content reproducing device; obtaining an address range of a buffer of the content reproducing device; intercepting system application programming interface calls related to memory access of said address range of said buffer; comparing the intercepted system application programming interface calls to an expected sequence of memory access calls; and determining that a particular memory access call is unauthorized when the particular memory access call accesses said address range of said buffer while not belonging to the expected sequence of memory access calls.

In an embodiment, the data is protected by encryption prior to the receiving, and the method further includes decrypting the received data stored in the memory storage device into unencrypted data by a media player module executed on a processing device of the content reproducing device; and storing the unencrypted data in said buffer.

In an embodiment, the buffer is a picture buffer in a random access memory device of the content reproducing device, and the method further includes copying the unencrypted data from the picture buffer to a frame buffer of the content reproducing device, the frame buffer providing the unencrypted data to a display device; obtaining an address range of the frame buffer; and intercepting the system application programming interface calls related to memory access of said address range of the frame buffer.

In an embodiment, the frame buffer is a memory space on a video and sound card of the content reproducing device.

In an embodiment, the method includes detecting whether the media player module is operating before said obtaining.

In an embodiment, the method includes storing a count of memory access calls that were determined to be unauthorized access; and comparing said count to a threshold value to make a determination that the unauthorized access of data has occurred.

In an embodiment, the method includes terminating the media player module in response to a determination that the unauthorized access of data has occurred.

In an embodiment, the method includes presenting a warning message on the display device in response to a determination that the unauthorized access of data has occurred.

In an embodiment, the method includes transmitting a message to the content provider in response to a determination that the unauthorized access of data has occurred.

In an embodiment, the message includes identification information of the content reproducing device.

In an embodiment, the message includes identification information of a licensee of the data.

In an embodiment, the intercepting utilizes a hooking technique.

In an embodiment, the system application programming interface calls related to memory access include at least one of: memcpy; and write.

In an embodiment, the method includes providing by the media player module the expected sequence of memory calls.

In an embodiment, the method includes providing by the content provider the media player module to the content reproducing device.

In an embodiment, the media player module provides a beginning address and a buffer size, and the obtaining the address range is based on said beginning address and said buffer size.

In an embodiment, a content reproducing device for reproducing data and detecting unauthorized access of said data includes a communication interface configured to receive data from a content provider; a memory storage device configured to store the received data; and a processor configured to copy the received data from the memory storage to a buffer of the memory storage device, obtain an address range of said buffer, intercept system application programming interface calls related to memory access of said address range of said buffer, compare the intercepted system application programming interface calls to an expected sequence of memory access calls, and determine that a particular memory access call is unauthorized when the particular memory access call accesses said address range of said buffer while not belonging to the expected sequence of memory access calls.

In an embodiment, the data is protected by encryption prior to reception by the communication interface, the media player software is configured to decrypt the received data into unencrypted data, and the processor is configured to store the unencrypted data in said buffer.

In an embodiment, a non-transitory computer readable recording medium is encoded with instructions, wherein the instructions, when executed on a processor of a content reproducing device, cause the content reproducing device to perform a method. The method includes receiving data from a content provider by the content reproducing device; storing the received data in a memory storage device of the content reproducing device; decrypting the protected data stored in the memory storage device into unencrypted data by a media player module executed on the processor of the content reproducing device; storing the unencrypted data in a buffer of the content reproducing device; obtaining an address range of said buffer of the content reproducing device; intercepting system application programming interface calls related to memory access of said address range of said buffer; comparing the intercepted system application programming interface calls to an expected sequence of memory access calls; and determining that a particular memory access call is unauthorized when the particular memory access call accesses said address range of said buffer while not belonging to the expected sequence of memory access calls.

In an embodiment, the instructions further cause the content reproducing device to decrypt the received data stored in the memory storage device into unencrypted data by a media player module executed on a processing device of the content reproducing device; and store the unencrypted data in said buffer.

In an embodiment, a method of detecting an unauthorized access of data includes receiving data from a content provider by a content reproducing device; executing a media player module that loads graphic libraries; storing the received data in a memory storage device of the content reproducing device; copying the stored received data in a buffer of the content reproducing device; monitoring a loading sequence of graphic libraries that are used by the media player module to access data stored in said buffer; comparing the monitored loading sequence to an expected loading sequence of graphic libraries; and determining that a particular call is the unauthorized access of data when the particular call is to a library that does not belong to the expected loading sequence of graphic libraries.

In an embodiment, the method includes decrypting the received data stored in the memory storage device into unencrypted data by the media player module executed on a processing device of the content reproducing device.

In an embodiment, a method includes receiving data from a content provider by a content reproducing device; storing the received data in a memory storage device of the content reproducing device; copying the stored received data in a buffer of the content reproducing device; obtaining a list of screen-capture programs; detecting that a program belonging to the list of content-capture programs is being executed at the same time as the media player module; and determining that unauthorized access of data is occurring when the program belonging to the list of screen-capture programs is detected.

BRIEF DESCRIPTION OF THE DRAWINGS

The present invention will become more fully understood from the detailed description given herein below and the accompanying drawings, which are given by way of illustration only and thus do not limit the present invention.

DETAILED DESCRIPTION

Figure 1:
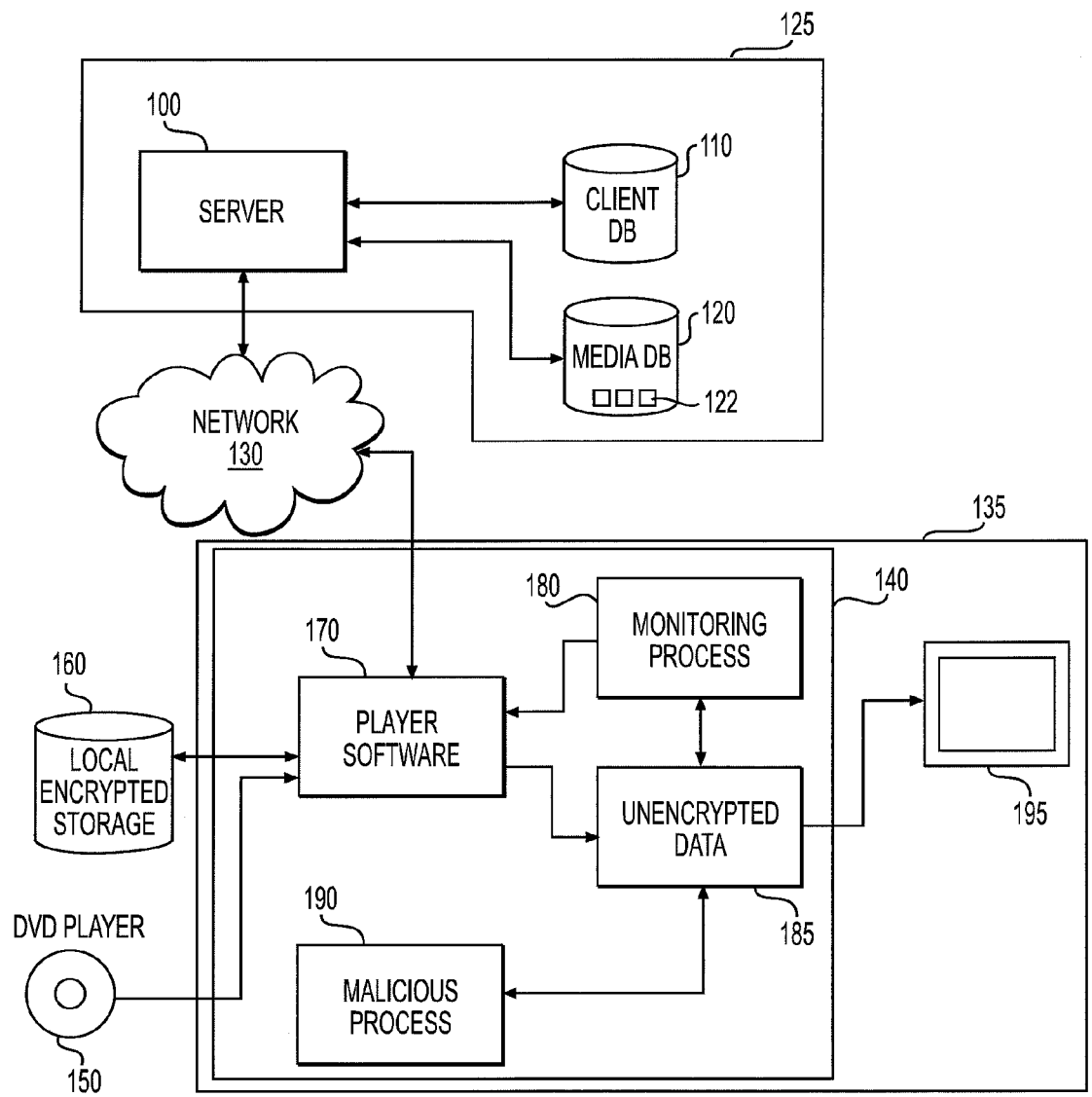
FIG. 1 is a block diagram illustrating a system according to an embodiment of the present invention.

FIG. 1 illustrates an exemplary embodiment of the invention that utilizes encryption to protect content 122. Encryption is one method of protecting content 122, but the invention is not limited to encryption. Other approaches for protecting content 122 are possible, and fully interchangeable for encryption, which is described below. Thus, the use of the terms "encryption" and "decryption" (and their derivative forms) in the following discussion are not intended to limit the scope in any way, but merely provide an exemplary embodiment that is illustrated from various perspectives in FIGS. 1-4. A person of ordinary skill in the art would recognize, based on the following disclosure, how to utilize alternative approaches for protecting data. Such alternative approaches might not use encryption. Thus, the term "protected data" is used to refer to data that is protected in some way (such as by encryption) and the term "unprotected data" is used to refer to data that has the protective measure removed (such as being decrypted), and is thus vulnerable to piracy and other unauthorized access.

As illustrated in FIG. 1, content 122 in the form of digital data, including digital media, is made available to a consumer by delivering digital media from a media source 125 to a media player 135 via a network 130. Examples of media sources include, but are not limited to, a server 100 that delivers digital media, such as a streaming media server, or a DVD player 150. Examples of media players include, but are not limited to, streaming media players, applications running on mobile devices, televisions, and software programs running on a computer 140. Although FIG. 1 illustrates player software 170 executing in a computer 140, similar software can be executed on other hardware platforms.

As illustrated in FIG. 1, digital media is received by media player 135 and forwarded to player software 170. Digital media may also be stored in local encrypted storage 160, or may be obtained from a DVD player 150. Media systems can be designed to work on personal computers such as computer 140 or laptop PCs, mobile devices such as tablets, and smart phones. Player software 170, although often protected with DRM schemes, does not protect the media content after it is decrypted. In other words, media content is typically vulnerable after it has been decrypted.

The player software 170 decrypts the protected digital data, to enable the reproduction of the digital data for a user's perception. The player software 170 may use public or private encryption and decryption keys to decrypt the digital data and generate unencrypted media data 185. As already mentioned above, encryption is only one of many possible schemes to protect the data. Thus, player software 170 may use any other scheme to remove protective measures from protected data to enable the data to be played.

Unencrypted media data 185 is stored in a memory buffer, which is described in more detail below. The memory buffer holds the unencrypted media data 185 until the data is provided to the display device 195. Examples of display devices include, but are not limited to, a screen, a computer, a television, a phone, a tablet screen, and a portable communication device. The memory buffer may hold the data for some time before providing it to the display device 195 to facilitate smooth reproduction of the data.

FIG. 1 illustrates a malicious process 190 accessing the unencrypted media data 185. Such a malicious process 190 could copy the unencrypted media data 185 and store it digitally, thus providing a high quality pirated copy. The pirated copy could then be saved locally on the computer 140 or transmitted elsewhere via network 130.

A monitoring process 180 is executed on the media player 135 and detects the activity of the malicious process 190. The monitoring process 180 may apply hooking technique to monitor memory accesses to the buffer storing the unencrypted media data 185 by external or foreign tasks so that illegal media content access can be detected. In addition, the monitoring process 180 may detect the presence and/or execution of a content-capture process, such as a screen-capture program. Screen-capture is one type of a content-capture process, but there are others that capture content other than the image on the screen. For example, other content-capture processes capture the audio being reproduced. The monitoring process 180 may also monitor a hardware video card 340 of computer 140 to detect tapping into the video card 340. Video card 340 may in fact be a video and audio card that performs both video and audio processing, even though it is referred to as video card 340.

Figure 2:
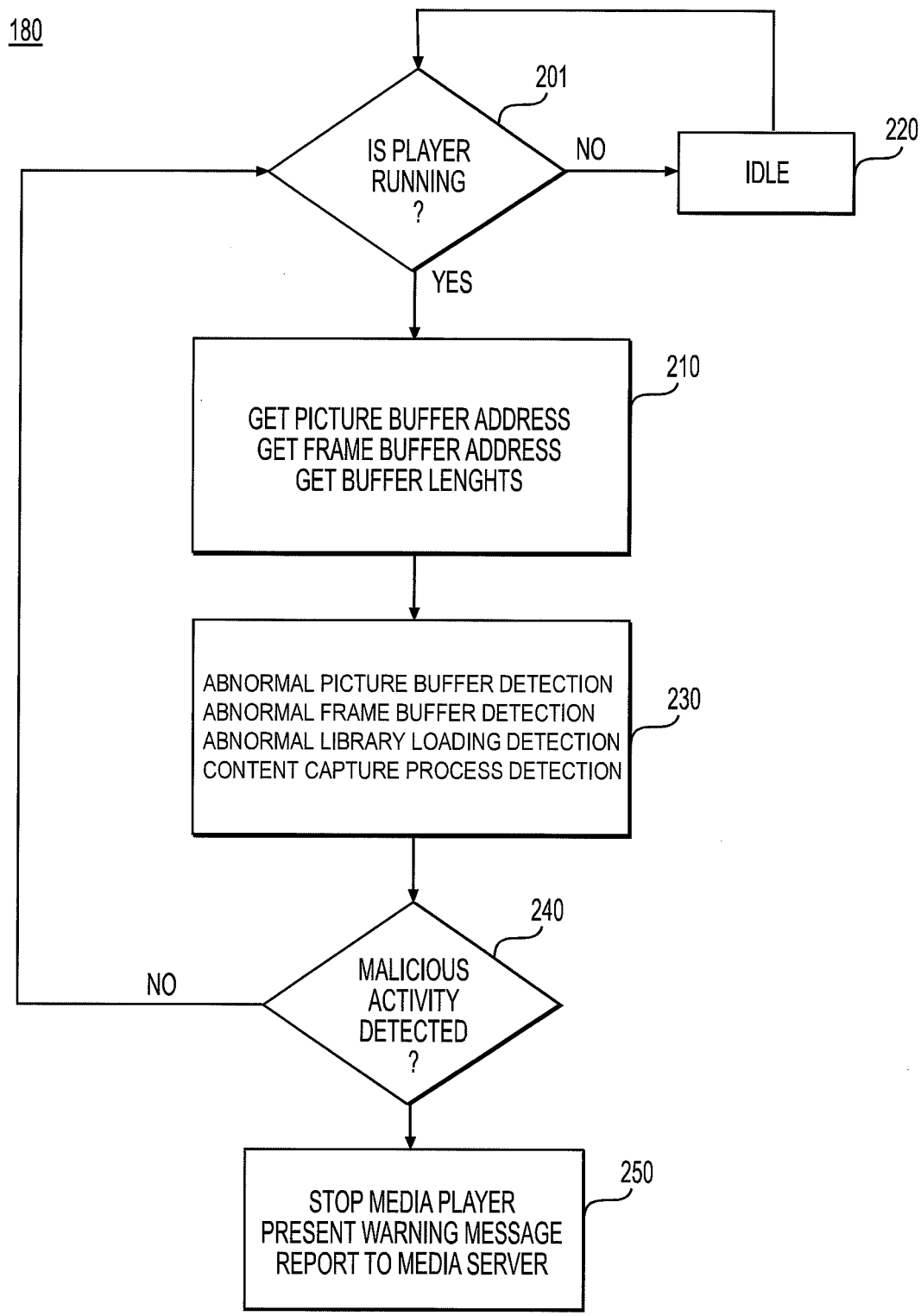
FIG. 2 is a flow chart of a monitoring process according to an embodiment of the present invention.

FIG. 2 illustrates additional details of monitoring process 180. The process determines in step 201 whether player software 170 is running. If the player software is not running, the monitoring process 180 enters an idle mode 220 where it uses minimal system resources and periodically returns to step 201.

If it is determined that the player software is running (i.e., being executed), the monitoring process 180 obtains picture buffer addresses from the player software 170 in step 210. The monitoring process 180 may also obtain frame buffer addresses and lengths of the buffers from the player software 170.

In step 230, the monitoring process 180 performs one or more detection processes which are described below. The result of step 230 may indicate that no malicious activity is detected in step 240. In that case, the monitoring process 180 will return to step 201 and repeat the above process.

On the other hand, if it is determined in step 240 that the results of step 230 indicate the presence of malicious activity, the monitoring process may take various actions.

In step 250, the monitoring process 180 may terminate the player software 170, thus ending the reproduction of content. It may also show a warning message that may be displayed on the display device 195 that is reproducing the content. It may also report the detection of the malicious activity to media source 125. Such a report may include identification information of the content that was being reproduced, a time and date identification of the malicious activity, identification information of the media player 135, and identification information of the user of the media player 135. The identification information may include, but is not limited to, an internet protocol (IP) address, and an identifier of the decryption key used to decrypt the content in the player software 170.

Based on the information received by the media source 125, the owner of the content that was subject to the malicious activity may take action against the user identified by the monitoring process 180. For example, the media source 125 may store information about users in client database 110, and designate a particular user as untrustworthy. A user designated as untrustworthy may be prevented from accessing content from the media source 125 in the future, and encryption and/or decryption keys associated with the user may be deactivated. For example, a public key associated with the user may be designated as untrustworthy, so that no media will be encrypted with that key by the media source 125 in the future.

Figure 3:
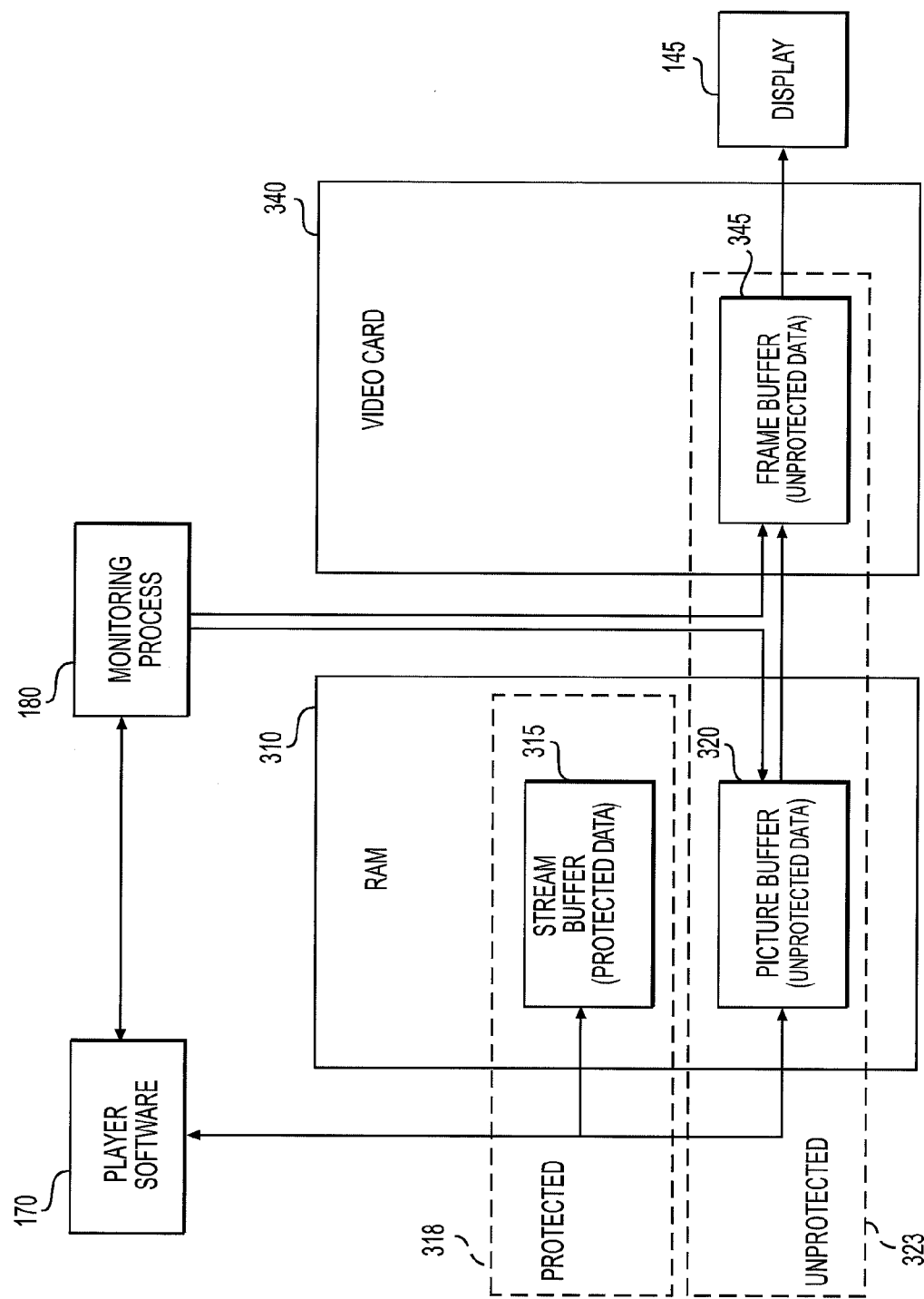
FIG. 3 is a block diagram of components of a system on a client device according to an embodiment of the present invention.

FIG. 3 illustrates additional details of an exemplary configuration of computer 140 with monitoring process 180. The monitoring process 180 is a separate program running as a service in the background. It is launched at the time the computer 140 started. It may also be launched when the player software 170 is started. The code for monitoring process 180 may be installed as part of the installation of player software 170, or it may be installed remotely by the media source 125 as part of registration of player software 170. The monitoring process 180 receives memory addresses to be protected from the media player 170.

As illustrated in FIG. 3, the computer 140 includes a random access memory (RAM) 310. A portion of the RAM 310 is allocated as a stream buffer 315, and another portion of the RAM 310 is allocated as a picture buffer 320. The stream buffer 315 stores, or buffers, an incoming stream of protected data 318. This data cannot be rendered on a display as it is encrypted.

The player software 170 accesses the stream buffer 315 and decrypts the stored data into unprotected data 323, and stores the decrypted data in the picture buffer 320.

The decrypted data stored in picture buffer 320 is then copied to frame buffer 345 on the video card 340. The video card 340 outputs data from the frame buffer 345 to the display device 195, which in turn presents content for a user's perception.

The player software 170 informs the monitoring process 180 of the addresses and sizes of the picture buffer 320 and/or the stream buffer 315 and/or the frame buffer 345. Thus, the monitoring process 180 is aware of specific memory locations where unencrypted content is stored after it is decrypted by the player software 170.

The decrypted data is vulnerable to interception and malicious copying when it is stored in the picture buffer 320. Thus, the monitoring process 180 monitors specific activity in the picture buffer 320 to detect malicious access.

Memory locations to be monitored are mainly picture buffer 320 (unencrypted picture data buffer) and frame buffer 345 (video frame buffer). Frame buffer 345 may be allocated on both RAM 310 and the video card 340.

The monitoring process 180 may use the hooking technique to intercept system application programming interface (API) calls related to memory access (such as memcpy, strcpy), which are called from other running processes. The term hooking represents a technique of getting control over a particular piece of code execution by intercepting a set of API calls. It provides a mechanism that can alter or augment the behavior of an operating system, of software applications, or of other software components without having their source code available.

Hooking technique can be used for intrusion detection, memory misuse detection, and antivirus software applications. Monitoring process 180 uses this technique to monitor running programs (processes) that are reading/writing memory locations that contain unencrypted media data. The monitoring process 180 is aware of the memory addresses where unencrypted data is stored based on the information it receives from the player software 170.

The following tables illustrate examples of specific detection process taking place in step 230. Specifically, the detection process may include one or more of the following: 1.) Abnormal picture buffer access detection; 2.) Abnormal frame buffer access detection; 3.) Abnormal library loading detection; and 4.) Video screen capture or audio capture process detection.

Table 1 illustrates an example expressed in pseudo-code of what would be considered a normal memory access sequence, and what would be considered an abnormal memory call sequence. The detection of the abnormal memory call sequence would indicate malicious access.

TABLE 1

| Normal media player memory access sequence | Abnormal memory call sequence |
|---|---|
| read(inputStream, pEncrypted);<br>decrypt(pEncrypted, pDecrypted);<br>memcpy(pDecrypted, pCodecBuf);<br>decode(pCodecBuf, pPictureBuf); | read(inputStream, pEncrypted);<br>decrypt(pEncrypted, pDecrypted);<br>memcpy(pDecrypted, pCodecBuf);<br>memcpy(pCodecBuf, pUnknownRAM)<br>write(file,pCodecBuf);<br>decode(pCodecBuf, pPictureBuf);<br>memcpy(pPictureBuf, pUnknownRAM)<br>write(file,pPictureBuf); |

In the normal access sequence, the encrypted media data is read from input stream into encrypted data buffer by the "read" function. The data in encrypted buffer is decrypted by "decrypt" function. The decrypted media data is copied in codec buffer by the "memcpy" function. Then the "decode" function decodes the media data as pictures and saves them in picture buffer. The text underlined in Table 1 above indicates specific instructions that make the sequence malicious, because they show that unencrypted data is being copied of the picture buffer 320 into an unexpected location, such as a file.

Table 2 presents an illustrative example in pseudo-code of what would be considered a normal frame buffer access sequence, and what would be considered an abnormal memory call sequence. However, this is not the only normal access sequence, and it is to be understood that many other normal sequences exist. Likewise, there are many specific examples of malicious or abnormal memory call sequences that would indicate malicious access.

TABLE 2

| Normal media player memory access sequence | Abnormal memory call sequence |
|---|---|
| pFrameBuf = memalloc(size);<br>memcpy(pPictureBuf, pFrameBuf); | pFrameBuf = memalloc(size);<br>memcpy(pPictureBuf,pUnknownRAM);<br>write(file,pPictureBuf);<br>memcpy(pPictureBuf, pFrameBuf); |

In the normal media player memory access sequence, the player allocates a piece of memory as frame buffer by the "memalloc" function. Then decoded pictures are copied into frame buffer by the "memcpy" function. The text underlined in Table 2 above indicates specific instructions that make the sequence malicious, because they show that unencrypted data is being copied of the picture buffer 320 into an unexpected location, such as a file.

A malicious attacker may load a fake library to bypass graphic library API calls so that unencrypted media data can be accessed outside of the media player. Table 3 illustrates an example in pseudo-code of what would be considered a normal library loading sequence, and what would be considered an abnormal sequence. This activity can be detected by monitoring how libraries were loaded when the media player process is executed. Some libraries that may be monitored include graphic libraries such as SDL (Simple DirectMedia Layer) and OpenGL (Open Graphics Library).

TABLE 3

| Normal library loading sequence | Abnormal library loading sequence |
|---|---|
| Player Lib<br>Codec Lib<br><br>SDL Lib<br>OpenGL Lib | Player Lib<br>Codec Lib<br>UnknownLib<br>SDL Lib<br>OpenGL Lib |

In the normal loading sequence, all the libraries loaded are needed for the player and in the order as designed. The text underlined in Table 3 above indicates specific instructions that make the sequence malicious because an unknown library was loaded which may access unencrypted media data.

Finally, the monitoring process 180 can monitor active tasks executing on the processor of player 135 and detect processes, which are known to be content capture processes. A screen capture process can save an image of the screen, but some can also tap into the stream of content data being played and store the streamed data.

The media source 125 may maintain and update a list of known content capture processes. The media source 125 may also provide the list of known content capture processes to player software 170, and may update the list in the player software every time the software 170 is started.

The software 170 may provide a list of know screen capture processes to the monitoring process 180. The list may include the content capture program name and/or the signature of the software. The media source 125 may also directly provide the list to the monitoring service 180 in addition or instead of to player software 170.

In some embodiments, the monitoring service 180 may determine that a particular process or task is a content program, even if it is not listed on the list of known content capture programs. The list will update automatically at the time it is detected if a new malicious processes or task are identified.

In an embodiment, the monitoring service 180 may store a history of abnormal activities and consider the aggregate activity when determining whether a malicious activity should be reported.

An advantage of the present invention is the ability to protect content between the player 135 and a video card or sound card driver. A video card driver is software that is very specific to particular hardware (a video card), and it is difficult and time consuming to develop and support all possible video card drivers. However, the monitoring process 180 is not specific to a particular video card driver, but instead can monitor memory locations that would be accessed by the video card driver. For audio content, the same concept is applied to a sound card driver.

Figure 4:
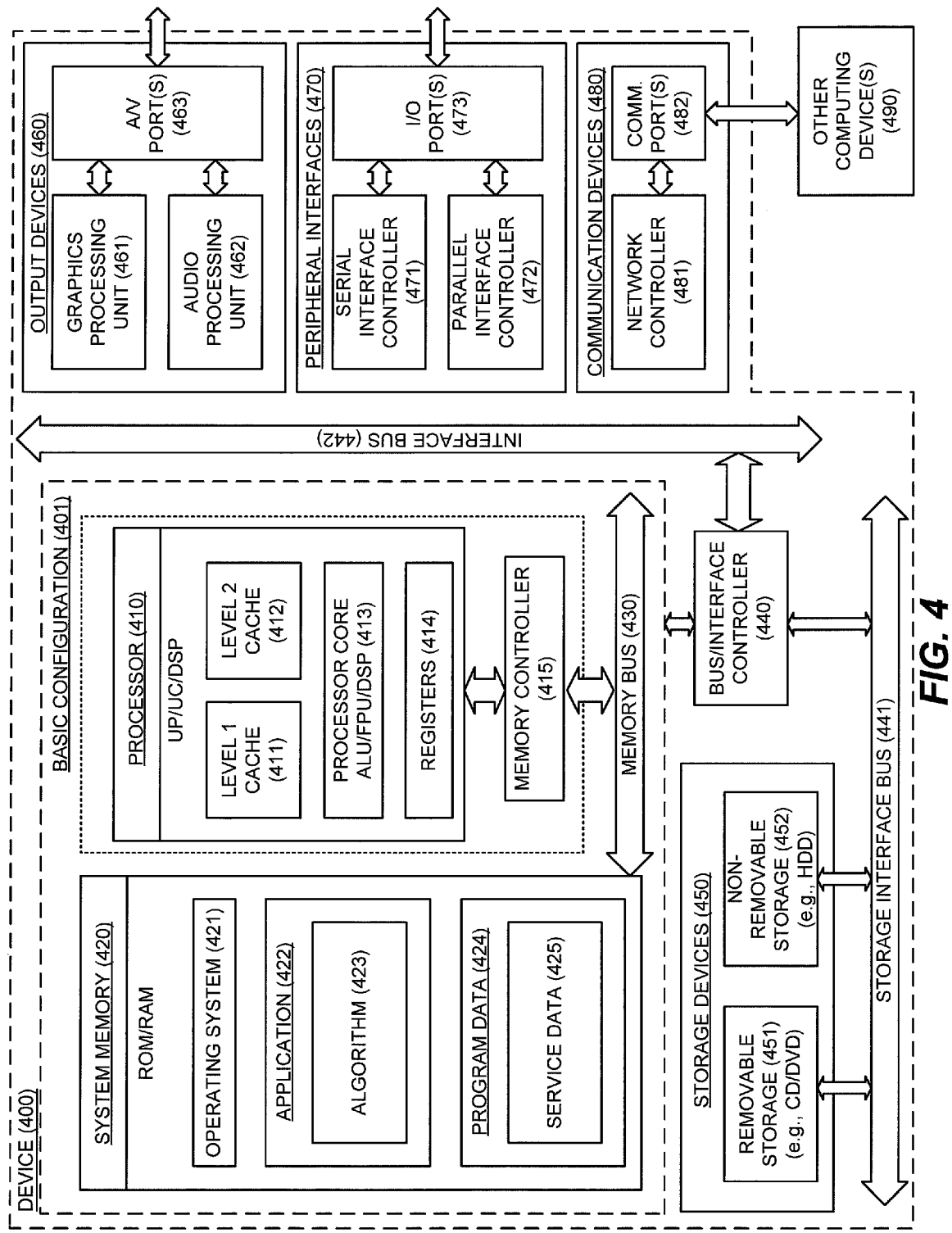
FIG. 4 illustrates an example of a computing device configured to perform a process according to an embodiment of the present invention.

The functionality described above may be implemented on special hardware such as would be included in a dedicated content reproduction apparatus, or may be implemented on a computing device 400. FIG. 4 is a block diagram illustrating an example computing device 400 that is arranged for implementing the monitoring functionality in accordance with the present disclosure. In a very basic configuration 401, computing device 400 typically includes one or more processors 410 and system memory 420. A memory bus 430 can be used for communicating between the processor 410 and the system memory 420.

Depending on the desired configuration, processor 410 can be of any type including but not limited to a microprocessor (μP), a microcontroller (μC), a digital signal processor (DSP), or any combination thereof. Processor 410 can include one more levels of caching, such as a level one cache 411 and a level two cache 412, a processor core 413, and registers 414. The processor core 413 can include an arithmetic logic unit (ALU), a floating point unit (FPU), a digital signal processing core (DSP Core), or any combination thereof. A memory controller 415 can also be used with the processor 410, or in some implementations the memory controller 415 can be an internal part of the processor 410.

Depending on the desired configuration, the system memory 420 can be of any type including but not limited to volatile memory (such as RAM), non-volatile memory (such as ROM, flash memory, etc.) or any combination thereof. System memory 420 typically includes an operating system 421, one or more applications 422, and program data 424. Application 422 includes player software 170 and monitoring process 180 encoded as a computer algorithm 423 that is arranged to decrypt protected content and performs the monitoring functionality described above. Program Data 424 may include the various buffer addresses and/or a list of known screen capture programs stored as service data 425. In some embodiments, application 422 can be arranged to operate with program data 424 on an operating system 421 to perform the software functionality and/or the monitoring service 180 functionality. This described basic configuration is illustrated in FIG. 4 by those components within dashed line 401.

Computing device 400 can have additional features or functionality, and additional interfaces to facilitate communications between the basic configuration 401 and any required devices and interfaces. For example, a bus/interface controller 440 can be used to facilitate communications between the basic configuration 401 and one or more data storage devices 450 via a storage interface bus 441. The data storage devices 450 can be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 420, removable storage 451 and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of device 400.

Device 400 can also include an interface bus 442 for facilitating communication from various interface devices (e.g., output interfaces, peripheral interfaces, and communication interfaces) to the basic configuration 401 via the bus/interface controller 440. Example output devices 460 include a graphics processing unit 461 and an audio processing unit 462, which can be configured to communicate to various external devices such as a display or speakers via one or more A/V ports 463. Example peripheral interfaces 470 include a serial interface controller 471 or a parallel interface controller 472, which can be configured to communicate with external devices such as input devices (e.g., keyboard, mouse, pen, voice input device, touch input device, etc.) or other peripheral devices (e.g., printer, scanner, etc.) via one or more I/O ports 473. An example communication device 480 includes a network controller 481, which can be arranged to facilitate communications with one or more other computing devices 490 over a network communication via one or more communication ports 482. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Device 400 may be implemented as a portion of a small-form factor portable (or mobile) electronic device such as a cell phone, a personal data assistant (PDA), a personal media player device, television set, a wireless web-watch device, a personal headset device, an application specific device, or a hybrid device that include any of the above functions. Computing device 400 can also be implemented as a personal computer including both laptop computer and non-laptop computer configurations.

There are various vehicles by which processes and/or systems and/or other technologies described herein can be effected (e.g., hardware, software, and/or firmware), and that the preferred vehicle will vary with the context in which the processes and/or systems and/or other technologies are deployed.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via electronic circuits such as Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, an audio output device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of detecting an unauthorized access of data, the method comprising:
    receiving encrypted data at a content reproducing device;
    storing the encrypted data in a portion of a memory storage device of the content reproducing device;
    decrypting the encrypted data stored in the memory storage device into unencrypted data;
    storing the unencrypted data as unprotected data in an unprotected buffer such that the unprotected data is vulnerable to unauthorized access;
    obtaining an address range of the unprotected buffer;
    intercepting a set of memory access calls related to memory access of said address range of said unprotected buffer;
    comparing the set of memory access calls to an expected sequence of memory access calls, the expected sequence of memory access calls including at least one call to copy the unprotected data from the unprotected buffer while the unprotected data is stored in the unprotected buffer; and
    determining that a particular memory access call from the set of memory access calls is unauthorized when the particular memory access call accesses said address range of said unprotected buffer while not belonging to the expected sequence of memory access calls and while the unprotected data is stored in the unprotected buffer.

2. The method according to claim 1, wherein the decrypting includes decrypting the encrypted data into unencrypted data by a media player executed on a processor of the content reproducing device.

3. The method according to claim 1, wherein said unprotected buffer is a picture buffer in a memory of the content reproducing device,
    the method further comprising:
        copying the unprotected data from the picture buffer to a frame buffer of the content reproducing device such that the frame buffer provides the unprotected data to a display device;
        obtaining an address range of the frame buffer; and
        intercepting a set of memory access calls related to memory access of said address range of the frame buffer.

4. The method according to claim 1, wherein the unprotected buffer is a frame buffer, the frame buffer is a memory space at least partially on a video card or a sound card of the content reproducing device.

5. The method according to claim 1, further comprising: detecting whether a media player is operating before said obtaining.

6. The method according to claim 1, further comprising: storing a count of memory access calls determined to be unauthorized access; and
comparing said count to a threshold value to make a determination that unauthorized access of the unprotected data has occurred.

7. The method according to claim 1, further comprising: terminating a media player in response to a determination that unauthorized access of the unprotected data has occurred.

8. The method according to claim 1, further comprising: presenting a warning message on a display device in response to a determination that unauthorized access of the unprotected data has occurred.

9. The method according to claim 1, further comprising: transmitting a message to a media source device in response to a determination that unauthorized access of the unprotected data has occurred.

10. The method according to claim 9, wherein the message includes identification information of the content reproducing device.

11. The method according to claim 9, wherein the message includes identification information of a licensee of the unprotected data.

12. The method according to claim 1, wherein the intercepting utilizes a hooking technique.

13. The method according to claim 1, wherein the set of memory access calls includes at least one of:
memcpy; or
write.

14. The method according to claim 1, further comprising: providing by a media player the expected sequence of memory access calls.

15. The method according to claim 14, further comprising:
receiving the media player from a media source device.

16. The method according to claim 1, further comprising: identifying a beginning address and a buffer size of the unprotected buffer,
the obtaining the address range is based on said beginning address and said buffer size.

17. A content reproducing device for detecting unauthorized access of data, the content reproducing device comprising:
a communication interface configured to receive encrypted data;
a memory storage device including an unprotected buffer; and
a processor operatively coupled to the communication interface and the memory storage device, the processor configured to:
store the encrypted data in a portion of the memory storage device,
decrypt the encrypted data stored in the memory storage device into unencrypted data,
store the unencrypted data as unprotected data in the unprotected buffer such that the unprotected data is vulnerable to unauthorized access,
obtain an address range of said unprotected buffer,
intercept a set of memory access calls related to memory access of said address range of said unprotected buffer,
compare the set of memory access calls to an expected sequence of memory access calls, the expected sequence of memory access calls including at least one call to copy the unprotected data from the unprotected buffer while the unprotected data is stored in the unprotected buffer, and
determine that a particular memory access call from the set of memory access calls is unauthorized when the particular memory access call accesses said address range of said unprotected buffer while not belonging to the expected sequence of memory access calls and while the unprotected data is stored in the unprotected buffer.

18. The content reproducing device according to claim 17, wherein
the processor is configured to execute a media player to decrypt the received data into the unencrypted data.

19. A non-transitory computer-readable recording medium encoded with instructions that, when executed on a processor of a content reproducing device, cause the content reproducing device to perform a method comprising:
receiving encrypted data at the content reproducing device;
storing the encrypted data in a portion of a memory storage device of the content reproducing device;
decrypting the encrypted data stored in the memory storage device into unencrypted data by the processor of the content reproducing device;
storing the unencrypted data as unprotected data in an unprotected buffer of the content reproducing device such that the unprotected data is vulnerable to unauthorized access;
obtaining an address range of said unprotected buffer of the content reproducing device;
intercepting a set of memory access calls related to memory access of said address range of said unprotected buffer;
comparing the set of memory access calls to an expected sequence of memory access calls, the expected sequence of memory access calls including at least one call to copy the unprotected data from the unprotected buffer while the unprotected data is stored in the unprotected buffer; and
determining that a particular memory access call from the set of memory access calls is unauthorized when the particular memory access call accesses said address range of said unprotected buffer while not belonging to the expected sequence of memory access calls and while the unprotected data is stored in the unprotected buffer.

20. The non-transitory computer readable recording medium according to claim 19, wherein the decrypting is performed by a media player executed on the processor of the content reproducing device.

21. The method according to claim 1, further comprising:
executing a media player that loads graphic libraries;
monitoring a loading sequence of graphic libraries that are used by the media player to access the unprotected data stored in said unprotected buffer;
comparing the monitored loading sequence to an expected loading sequence of graphic libraries; and
determining that a particular call is an unauthorized access of the unprotected data stored in the unprotected buffer when the particular call is to a library that is not within the expected loading sequence of graphic libraries.

22. The method according to claim 1, further comprising:
obtaining a list of content-capture processes;
detecting that a process included within the list of content-capture processes is being executed at the same time as a media player used to access the unprotected data within the unprotected buffer; and
determining that unauthorized access of the unprotected data is occurring when the process included within the list of content-capture processes is detected.

23. The method according to claim 1, further comprising:
sending, to a media source device and in response to the determining, an indicator associated with the content reproducing device such that the media source device ceases providing data to the content reproducing device.

24. The method according to claim 1, wherein the receiving includes receiving the encrypted data from a media source device.

25. The method according to claim 1, wherein the set of memory access calls includes at least one system application programming interface call.

26. The content reproducing device according to claim 17, wherein the communication interface is configured to send, to a media source device and in response to the determining, an indicator associated with the content reproducing device such that the media source device ceases providing data to the communication interface.

27. The non-transitory computer readable recording medium according to claim 19, wherein the method further comprises:
sending, to a media source device and in response to the determining, an indicator associated with the content reproducing device such that the media source device ceases providing data to the content reproducing device.

28. The method according to claim 21, further comprising:
sending, to a media source device and in response to the determining that the particular call is an unauthorized access of the unprotected data when the particular call is to the library that is not within the expected loading sequence of graphic libraries, an indicator associated with the content reproducing device such that the media source device ceases providing data to the content reproducing device.

29. The method according to claim 22, further comprising:
sending, to a media source device and in response to the determining that unauthorized access of the unprotected data is occurring when the process included within the list of content-capture processes is detected, an indicator associated with the content reproducing device such that the media source device ceases providing data to the content reproducing device.

* * * * *